US012131117B1

(12) United States Patent
McRedmond et al.

(10) Patent No.: US 12,131,117 B1
(45) Date of Patent: *Oct. 29, 2024

(54) SYSTEMS AND METHODS FOR LINKING A DATA SET TO RECURRING DATA ELEMENTS

(71) Applicant: CITIBANK, N.A., New York, NY (US)

(72) Inventors: Richard McRedmond, New York, NY (US); Ranjit Bhattacharjee, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,053

(22) Filed: Jan. 19, 2023

Related U.S. Application Data

(63) Continuation of application No. 16/167,010, filed on Oct. 22, 2018, now Pat. No. 11,586,807.

(51) Int. Cl.
| | |
|---|---|
| *G06F 40/174* | (2020.01) |
| *G06F 16/13* | (2019.01) |
| *G06F 16/93* | (2019.01) |
| *G06F 40/103* | (2020.01) |
| *G06Q 40/03* | (2023.01) |

(52) U.S. Cl.
CPC .......... *G06F 40/174* (2020.01); *G06F 16/13* (2019.01); *G06F 16/93* (2019.01); *G06F 40/103* (2020.01); *G06Q 40/03* (2023.01)

(58) Field of Classification Search
CPC ........ G06F 16/93; G06F 16/13; G06F 40/103; G06F 40/174; G06Q 40/025
See application file for complete search history.

(56) References Cited

U.S. PATENT DOCUMENTS

| | | | |
|---|---|---|---|
| 7,225,399 B2 * | 5/2007 | Watson | G06F 40/151 |
| | | | 715/210 |
| 8,571,973 B1 * | 10/2013 | Haberaecker | G06Q 40/03 |
| | | | 705/38 |
| 8,571,974 B1 | 10/2013 | Coleman | |
| 10,572,952 B1 | 2/2020 | Wang et al. | |
| 11,586,807 B1 * | 2/2023 | McRedmond | G06F 16/13 |

(Continued)

OTHER PUBLICATIONS

Final Office Action for U.S. Appl. No. 16/167,010, filed Sep. 4, 2020, 19 pages.

(Continued)

*Primary Examiner* — Kyle R Stork
(74) *Attorney, Agent, or Firm* — Perkins Coie LLP

(57) ABSTRACT

Systems and methods for linking a data set to respective locations of relevant data elements in documents included in electronic files in which a formatting server identifies a specific location of each occurrence of each of a plurality of different categories of fields in documents in an electronic file and links an identifier of each of the categories to each specific location of each of the occurrences. Thereafter, a review server compares data populating all of the occurrences at each specific location of at least one of the categories of fields to which the identifier of the particular category of fields is linked and generates a notification when the data populating any of the occurrences differs from data populating any of the other occurrences of the same category of fields.

20 Claims, 8 Drawing Sheets

(56) References Cited

U.S. PATENT DOCUMENTS

| | | |
|---|---|---|
| 2004/0139059 A1 | 7/2004 | Conroy et al. |
| 2009/0129931 A1 | 5/2009 | Stiesdal |
| 2014/0244456 A1* | 8/2014 | Huang ................. G06Q 40/123 |
| | | 705/31 |
| 2014/0281871 A1 | 9/2014 | Brunner et al. |
| 2016/0217119 A1* | 7/2016 | Dakin ................... G06F 40/274 |

OTHER PUBLICATIONS

Office Action for U.S. Appl. No. 16/167,010, filed Jan. 25, 2021, 20 pages.
Final Office Action for U.S. Appl. No. 16/167,010, filed Feb. 4, 2022, 22 pages.
Office Action for U.S. Appl. No. 16/167,010, filed Apr. 7, 2020, 17 pages.
Office Action for U.S. Appl. No. 16/167,010, filed May 11, 2022, 23 pages.
Final Office Action for U.S. Appl. No. 16/167,010, filed Jun. 21, 2021, 22 pages.
Office Action for U.S. Appl. No. 16/167,010, filed Sep. 15, 2021, 19 pages.

* cited by examiner

| page | vert off to up left | horz off to up left | vert off to low right | horz off to low right | Doc Name | Value |
|---|---|---|---|---|---|---|
| 1 | 414 | 126 | 432 | 198 | Original Loan Amount | 336,000 |
| 31 | 288 | 36 | 297 | 108 | UNIFORM RESIDENTIAL LOAN APP | 336,000 |
| 77 | 252 | 234 | 270 | 288 | Aaaa CORP (LOAN ESTIMATE) | 335,000 |
| 78 | 522 | 612 | 540 | 648 | Aaaa CORP (LOAN ESTIMATE) | 336,000 |
| 84 | 162 | 144 | 180 | 216 | RATE LOCK AGREEMENT | 336,000 |
| 212 | 684 | 288 | 702 | 360 | Bbbb TITLE: LOAN ESCROW INSTRUCTIONS | 336,000 |
| 243 | 270 | 468 | 288 | 504 | Cccc Scoring Results | 336,000 |
| 266 | 216 | 216 | 252 | 270 | Dddd Residential Lending: Loan Estimate | 336,000 |
| 267 | 486 | 612 | 504 | 648 | Dddd Residential Lending: Loan Estimate | 336,000 |

FIG. 1

Aaaa Corporation

Loan Estimate

Save this Loan Estimate to compare with your Closing Disclosure.

DATE ISSUED
APPLICANTS
PROPERTY
EST. PROP. VALUE $975,000

LOAN TERM 15 years
PURPOSE Refinance
PRODUCT Fixed Rate
LOAN TYPE ☒ Conventional ☐ FHA ☐ VA ☐
LOAN ID # 05466
RATE LOCK ☐ NO ☒ YES, until 12/7/2017 at 5:00 p.m. EST
Before closing, your interest rate, points, and lender credits can change unless you lock the interest rate. All other estimated closing costs expire on 12/7/2018 at 5:00 p.m. EST

200

202

| Loan Terms | | Can this amount increase after closing? |
|---|---|---|
| Loan Amount | $335,000 | NO |
| Interest Rate | 3% | NO |
| Monthly Principal & Interest<br>See Projected Payments below for your<br>Estimated Total Monthly Payment | $2,313.45 | NO |
| | | Does the loan have these features? |
| Prepayment Penalty | | NO |
| Balloon Payment | | NO |

Uniform Underwriting and Transmittal Summary
DU Underwriting Findings
Mortgage Fraud is Investigated by the FBI
Ack of Receipt of Info Booklets
Additional Details For Services You Can shop For
Automated Valuation Model Notice
California Copies of Signed Documents
Aaaa Co. Loan Estimate
What Does Aaaa Co. Do With Your Personal Info?
Rate Lock Agreement
Privacy Act Statement Collection and Use of Personal Info
eSign Certificate
Look Up A Zip Code
Home Lending: Mortgage Loan Statement
Lease Agreement
Mortgage Loan Statement
Mortgage Loan Statement
Letter Re: The Name of Borrower
Letter Re: Prior Addresses
Home Lending: Payoff Statement
Deed of Trust: Title Company
CA Certificate of Ack
Residential Lending: Loan Estimate
Loan Detail Report
CA Domestic Partner Addendum to Uniform Res. Loan Apply
Uniform Residential Loan Application
Mortgage Fraud Is Investigated By The FBI
Certificate of Loans to One Borrower
302  Borrower Debt Certification
Automated Valuation Model Notice
Compliance Agreement
CA Certificate of Ack

FIG. 3

FTP_004776030720_25348_closing_docs.pdf 82 / 173

400

COMPLIANCE AGREEMENT

Loan Number: 05466

Seller(s):

Lender: Aaaa CORPORATION (NMLS # XXXXX)

Borrower(s): John Doe

Property: Road, Township, California 9200

The undersigned borrower(s) for and in consideration of the above referenced Lender this date funding the closing of this loan agrees, if requested by Lender or Closing Agent for Lender, to fully cooperate and adjust for clerical errors, any or all loan closing documentation if deemed necessary or desirable in the reasonable discretion of Lender to enable Lender to sell, convey, seek guaranty or market said loan to any entity, including but not limited to, an investor, Fannie Mae, Freddie Mac, Federal Housing Authority, the Department of Veterans Affairs or any municipal bonding authority.

The undersigned borrower(s) agree(s) to comply with all above noted requests by Lender or Closing Agent for Lender within 30 days from the date of mailing said requests. Borrower(s) agree(s) to assume all costs including, by way of illustration and not limitation, actual expenses, legal fees and marketing losses, for failing to comply with correction requests in such 30 day time period.

The undersigned borrower(s) do hereby so agree and covenant in order to assure that the loan documentation executed this date will conform and be acceptable in the market place in the instance of transfer, sale or conveyance by Lender or its interest in illustration and not limitation, actual expenses, legal fees and marketing losses, for failing to comply with correction requests in such 30 day time period.

The undersigned borrower(s) do hereby so agree and covenant in order to assure that the loan documentation executed this date will conform and be acceptable in the market place in the instance of transfer, sale or conveyance by Lender or its interest in and to said loan documentation.

Dated effective DECEMBER 4, 2018

FIG. 4

Income Verification — 500

| pg | vert off to up left | horz off to up left | vert off to low right | horz off to low right |
|---|---|---|---|---|
| 166 | 319 | 135 | 328 | 207 |

FIG. 5

Income Calculation Worksheet

602 → 319  610 → 328

| Borrower Name | John Doe | Loan Number | 54 |
| --- | --- | --- | --- |
| Employer | Eeee Company | Date | 11/24 |

Pay Type

Hourly

| | $ | Per Hour | 0 | # of hours | X52/12 | $ - |
| --- | --- | --- | --- | --- | --- | --- |
| | $ - | YTD Earnings | | # of months | | $ - |
| | $ - | W2 for Tax Year: 2016 | 12 | # of months | | $ - |
| | $ - | W2 for Tax Year: 2015 | 12 | # of months | | $ - |
| ☐ | $ - | Per Hour | | | | |
| ☐ | $ - | YTD Avg | | | | |
| ☐ | $ - | YTD + 1 W2 Avg | | | | |
| ☐ | $ - | YTD + 2 Yr W2 Avg | | | | |
| | $ | Use lowest income | or check the income you wish to use | | | $ - |

Salary — Type of Salary

604 →

| | | $ - | Monthly | x1 | = | $ - |
| --- | --- | --- | --- | --- | --- | --- |
| | ☐ | $ - | By Weekly | x26/12 | = | $ - |
| | ☒ | $ 3,004.17 | Semi Monthly | x24/12 | = | $ 7608.34 |
| 606 | ☐ | $ - | Weekly | x52/12 | = | $ - |

135 →

| | $ 76,083.40 | YTD Salary (paystub) | 10 | # of months | $ 7,608.34 |
| --- | --- | --- | --- | --- | --- |
| ☐ | $ 112,255.99 | W2 Income — 608 | 12 | # of months | $ 9,354.66 |
| ☐ | $ 116,901.14 | W2 Income | 12 | # of months | $ 9,700.10 |

207 → 612

| $ 7608.34 | Base Used to Qualify | check the salary you wish to use | If YTD or past year is l |
| --- | --- | --- | --- |
| | | | Otherwise, lower of YT |

Overtime/Bonus — Break out OT/Bonus from base salary

| $ 41,000.00 | YTD Overtime/Bonus | 10 | # of months | $ 4,100.00 |
| --- | --- | --- | --- | --- |
| $ 37,100.00 | Past year OT breakout | 12 | # of months | $ 3,091.67 |
| $ 44,200.00 | Additional year OT/Bonus | 12 | # of months | $ 3,683.33 |

| ☒ | $ 4,100.00 | YTD Avg | *If DU requires only # YTD paystub, OT/Bonus |
| --- | --- | --- | --- |
| ☐ | $ 3,550.00 | YTD + 1 year Avg | Divide YTD OT/Bonus by 12 months |
| ☐ | $ 3,597.06 | YTD + 2 year Avg | |

| $ 3,550.00 | Use lower of calculation | or check the income you wish to use | $ 4,100.00 |
| --- | --- | --- | --- |

Commission — Break out commission from base salary

| $ - | YTD Commission | minus Expenses | | expenses based upon |
| --- | --- | --- | --- | --- |
| $ - | Past year commission | minus Expenses | | 2106 Expenses |
| $ - | Additional year commission | minus Expenses | | 2106 expenses |

FIG. 6

SYSTEMS AND METHODS FOR LINKING A DATA SET TO RECURRING DATA ELEMENTS

CROSS REFERENCE TO RELATED APPLICATIONS

This application is a continuation of co-pending U.S. patent application Ser. No. 16/167,010 filed Oct. 22, 2018. The content of the foregoing application is incorporated herein in its entirety by reference.

FIELD OF THE INVENTION

The present invention relates generally to systems and methods for linking a data set to recurring data elements within electronic files, and more particularly to technological solutions implementing systems and methods for linking a data set to respective locations of relevant data elements in documents included in electronic files.

BACKGROUND OF THE INVENTION

A mortgage loan package is a collection of all documents needed for the processing and closing of a mortgage loan. Such mortgage loan package may include, for example, relevant information about the borrower, such as borrower pay stubs, borrower W2 forms, and borrower ID verification; about the property, such as an appraisal; and about the mortgage loan, such as the mortgage loan note. This information is used in underwriting of the loan and may consist of numerous file documents in various electronic formats. Typically, many thousands of mortgage loans may be traded between different counterparties in the secondary mortgage market every day. When a counterparty invests in the purchase of a mortgage loan, the counterparty must review the loan file to ensure that the loan was underwritten according to guidelines suitable to the investor.

Currently, most loans are underwritten according to requirements of secondary mortgage market lenders, such as Federal National Mortgage Association (FNMA) and Federal Home Loan Mortgage Corporation (FHLMC) guidelines, but there are also many loans that are underwritten to requirements of private investors. Such underwriting requirements may vary according to a particular investor, and standardization in terms of loan documents included in a mortgage loan package is limited at best. For example, residential appraisals may typically vary from state to state, pay stubs may depend on the employer, and documents used for verification of borrower identification, such as drivers' licenses, may also vary depending on the state.

The present lack of standardization results in a tedious and cumbersome process for underwriters or buyers of mortgage loans. For example, upon receiving a mortgage loan file by an investor, it is necessary to verify data consistency and accuracy in hundreds of instances, which may currently require careful visual checking of information that is not received in a standard format. Typically, when an investor purchases a mortgage loan, the purchase may be based on a small subset of data known as a data set, and loan files are often received with data sets which do not lead back to source documents, making verification of the validity of that data very difficult. Therefore, the investor must review the mortgage loan file to ensure that it meets all the investor's underwriting requirements. Such loan file review is currently a complicated process which may involve, for example, physically inspecting each of hundreds of pages of many different kinds of loan documents included in the mortgage loan file.

At least some effort has previously been made to develop a standard data set to accompany a mortgage loan file, such as the Mortgage Industry Standards Maintenance Organization (MISMO) data set sponsored by FNMA and FHLMC that identifies data points and data delivery format for delivery of loans to FNMA and FHLMC. While the MISMO data set is intended to be representative of what is in a mortgage loan file, the MISMO data set does not include anything that links to the actual mortgage loan documents in the mortgage loan file. Thus, there is nothing in the MISMO data set to verify that a MISMO data set accompanying a mortgage loan file actually corresponds to information contained in the mortgage loan documents. Additionally, many optical checks, such as signatures, are not captured in these data sets.

There is a current need for systems and methods for linking a data set to locations of relevant elements of complex data sets to respective locations of relevant data elements in documents included in electronic files, such as mortgage loan files, that address the problems of the above identified legacy mechanisms. The problem solved by embodiments of the invention is rooted in technological limitations of such legacy approaches. Improved techniques and, in particular, improved applications of technology are needed to address the problems of currently employed mechanisms. More specifically, the aforementioned legacy approaches fail to achieve the sought-after capabilities of the herein-disclosed techniques for systems and methods for linking a data set to locations of relevant elements of complex data sets to respective locations of relevant data elements in documents included in electronic files.

SUMMARY OF THE INVENTION

Embodiments of the invention advance the technical fields for addressing problems associated with the above described currently employed mechanisms, as well as advancing peripheral technical fields. Such embodiments are directed to technological solutions that may involve a system that may include, for example, a field location function of one or more processors of a formatting server coupled to memory that identifies a specific location of each occurrence of each of a plurality of different predefined categories of fields in a plurality of documents in an electronic file; and an indexing function of the one or more processors of the formatting server that links an identifier of each of the plurality of different predefined categories of fields to each specific location of each of said occurrences of the plurality of different predefined categories of fields in the plurality of documents in the electronic file.

Such system may further involve a scan function of one or more processors of a review server coupled to memory that thereafter compares data populating all of said occurrences at each specific location of at least one of said predefined categories of fields to which the identifier of said at least one of said predefined categories of fields in the plurality of documents in the electronic file is linked; and an alert function of the one or more processors of the review server that generates a notification when the data populating any of the occurrences of the at least one of said predefined categories of fields in the plurality of documents in the electronic file differs from data populating any of the other occurrences of the at least one of said predefined categories of fields in the plurality of documents in the electronic file.

An additional aspect of embodiments of the invention may involve, for example, the field location function of the one or more processors of the formatting server that identifies a coordinate-based specific location of each said occurrence of each of the plurality of different predefined categories of fields in each of the plurality of documents in the electronic file. A further aspect may involve, for example, the field location function of the one or more processors of the formatting server that identifies coordinate-based horizontal and vertical coordinates for the specific location of each said occurrence of each of the plurality of different predefined categories of fields in each of the plurality of documents in the electronic file. Another aspect may involve, for example, the field location function of the one or more processors of the formatting server that identifies coordinate-based horizontal and vertical coordinates and a page number for the specific location of each said occurrence of each of the plurality of different predefined categories of fields in each of the plurality of documents in the electronic file.

Another aspect of embodiments of the invention may involve, for example, the field location function of the one or more processors of the formatting server that identifies the specific location of each occurrence of each of the plurality of different pre-defined categories of fields in the plurality of documents in the electronic file selected from a data set corresponding to information contained in the plurality of documents in the electronic file. An additional aspect may involve, for example, the field location function of the one or more processors of the formatting server that identifies the specific location of each occurrence of each of the plurality of different pre-defined categories of fields comprising at least one of a mortgage loan amount field, a mortgage loan property appraisal value field, a borrower income amount field, a borrower credit score field, or a borrower signature field in the plurality of documents in the electronic file.

Still another aspect of embodiments of the invention may involve, for example, the indexing function of the one or more processors of the formatting serve that links the identifier of each of the plurality of different predefined categories of fields to each specific location comprising a coordinate-based specific location of each of said occurrences of the plurality of different predefined categories of fields in the plurality of documents in the electronic file. A still further aspect may involve, for example, the indexing function of the one or more processors of the formatting server that links the identifier of each of the plurality of different predefined categories of fields to each specific location comprising coordinate-based horizontal and vertical coordinates of the specific location of each of said occurrences of the plurality of different predefined categories of fields in the plurality of documents in the electronic file.

A further aspect of embodiments of the invention may involve, for example, the indexing function of the one or more processors of the formatting server that links the identifier of each of the plurality of different predefined categories of fields to each specific location comprising coordinate-based horizontal and vertical coordinates and a page number for the specific location of each of said occurrences of the plurality of different predefined categories of fields in the plurality of documents in the electronic file. An additional aspect may involve, for example, the indexing function of the one or more processors of the formatting server that links the identifier of each of the plurality of different predefined categories of fields comprising at least one of a mortgage loan amount field, a mortgage loan property appraisal value field, a borrower income amount field, a borrower credit score field, or a borrower signature field to each specific location of each of said occurrences of the plurality of different predefined categories of fields in the plurality of documents in the electronic file.

Another aspect of embodiments of the invention may involve, for example, the scan function of the one or more processors of the review server that compares recurring data populating all of said occurrences at each specific location of at least one of said predefined categories of fields to which the identifier of said at least one of said predefined categories of fields in the plurality of documents in the electronic file is linked. A further aspect may involve, for example, the scan function of the one or more processors of the review server that compares recurring mortgage loan data populating all of said occurrences at each specific location of at least one of said predefined categories of fields to which the identifier of said at least one of said predefined categories of fields in the plurality of documents in the electronic file is linked.

A still further aspect of embodiments of the invention may involve, for example, the scan function of the one or more processors of the review server that compares recurring mortgage loan data populating all of said occurrences of at least one of said predefined categories of fields comprising at least one of a mortgage loan amount field, a mortgage loan property appraisal value field, a borrower income amount field, a borrower credit score field, or a borrower signature field to which the identifier of said at least one of said predefined categories of fields in the plurality of documents in the electronic file is linked.

An additional aspect of embodiments of the invention may involve, for example, the alert function of the one or more processors of the review server that generates the notification when data comprising recurring data populating any of the occurrences of the at least one of said predefined categories of fields in the plurality of documents in the electronic file differs from data populating any of the other occurrences of the at least one of said predefined categories of fields in the plurality of documents in the electronic file. Another aspect may involve, for example, the alert function of the one or more processors of the review server that generates the notification when data comprising recurring mortgage loan data populating any of the occurrences of the at least one of said predefined categories of fields in the plurality of documents in the electronic file differs from data populating any of the other occurrences of the at least one of said predefined categories of fields in the plurality of documents in the electronic file.

Still another aspect of embodiments of the invention may involve, for example, the alert function of the one or more processors of the review server that generates the notification when data comprising recurring mortgage loan data populating any of the occurrences of the at least one of said predefined categories of fields comprising at least one of a mortgage loan amount field, a mortgage loan property appraisal value field, a borrower income amount field, a borrower credit score field, or a borrower signature field in the plurality of documents in the electronic file differs from data populating any of the other occurrences of the at least one of said predefined categories of fields in the plurality of documents in the electronic file.

Embodiments directed to the technological solutions described herein may also involve a method that may employ computer hardware and software, including, without limitation, one or more processors coupled to memory and non-transitory computer-readable storage media with one or more executable programs stored thereon which instruct the processors to perform methods that may involve, for example, identifying, by a field location function of one or more processors of a formatting server coupled to memory, a specific location of each occurrence of each of a plurality of different predefined categories of fields in the plurality of documents in the electronic file; and linking, by the indexing function of the one or more processors of the formatting server, an identifier of each of the plurality of different predefined categories of fields to each specific location of each of said occurrences of the plurality of different predefined categories of fields in the plurality of documents in the electronic file.

Such method may further involve, for example, thereafter comparing, by a scan function of one or more processors of a review server coupled to memory, data populating all of said occurrences at each specific location of at least one of said predefined categories of fields to which the identifier of said at least one of said predefined categories of fields in the plurality of documents in the electronic file is linked; and generating, by an alert function of the one or more processors of the review server, a notification when the data populating any of the occurrences of the at least one of said predefined categories of fields in the plurality of documents in the electronic file differs from data populating any of the other occurrences of the at least one of said predefined categories of fields in the plurality of documents in the electronic file.

Further embodiments may be directed to the technological solutions described herein that may include a system that may involve, for example, one or more processors of a review server coupled to memory that receives an electronic file comprising a plurality of documents having occurrences of a plurality of different predefined categories of fields, specific locations for each of which occurrences are linked to an identifier of each of the plurality of different predefined categories of fields; a scan function of one or more processors of a review server coupled to memory that compares data populating all of said occurrences at each specific location of at least one of said predefined categories of fields to which the identifier of said at least one of said predefined categories of fields in the plurality of documents in the electronic file is linked; and an alert function of the one or more processors of the review server that generates a notification when the data populating any of the occurrences of the at least one of said predefined categories of fields in the plurality of documents in the electronic file differs from data populating any of the other occurrences of the at least one of said predefined categories of fields in the plurality of documents in the electronic file.

Still further embodiments may be directed to the technological solutions described herein that may include a method that may involve, for example, receiving, by one or more processors of a review server coupled to memory, an electronic file comprising a plurality of documents having occurrences of a plurality of different predefined categories of fields, specific locations for each of which occurrences are linked to an identifier of each of the plurality of different predefined categories of fields; comparing, by a scan function of one or more processors of a review server coupled to memory, data populating all of said occurrences at each specific location of at least one of said predefined categories of fields to which the identifier of said at least one of said predefined categories of fields in the plurality of documents in the electronic file is linked; and generating, by an alert function of the one or more processors of the review server, a notification when the data populating any of the occurrences of the at least one of said predefined categories of fields in the plurality of documents in the electronic file differs from data populating any of the other occurrences of the at least one of said predefined categories of fields in the plurality of documents in the electronic file.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

BRIEF DESCRIPTION OF THE DRAWINGS

FIG. 1 is a table that illustrates an example of coordinates measured in points from the top and left margins of each page to the upper left and lower right corners, respectively, for each occurrence of a particular field, such as a loan amount field in a mortgage loan package, for embodiments of the invention;

FIG. 2 illustrates an example of a loan estimate document having a loan amount field value corresponding to a field value shown in FIG. 1 that is different from the field values for all other occurrences of the same field for embodiments of the invention;

FIG. 3 illustrates an example of a display of a list of a small sample of mortgage loan documents that may be indexed by name and which may include links to fields in actual documents in an electronic mortgage loan file corresponding to those names for embodiments of the invention;

FIG. 4 shows an example of a particular loan document which may be displayed by clicking on the corresponding document name on the index of names displayed in FIG. 3 for embodiments of the invention;

FIG. 5 illustrates an example of coordinates for an occurrence of a field for embodiments of the invention;

FIG. 6 illustrates an example of a document shown with vertical and horizontal distances, respectively, to the upper left corner of the field and vertical and horizontal distances, respectively, to the lower right corner of the field corresponding to the coordinates shown in FIG. 5 for embodiments of the invention;

DETAILED DESCRIPTION

Figure 7:
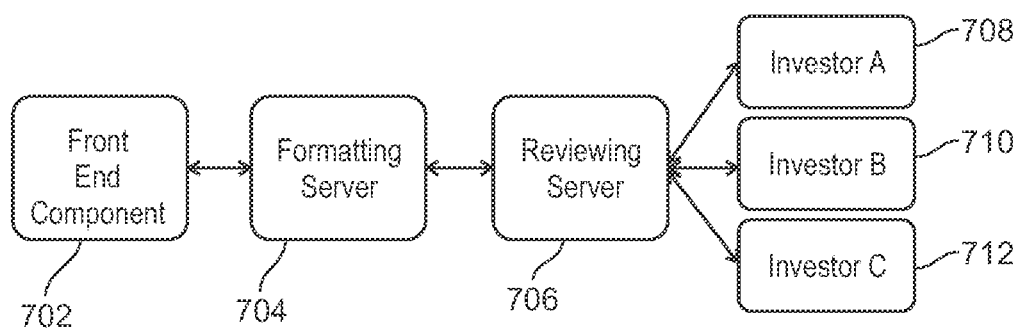
FIG. 7 is a schematic flow chart that illustrates an example of components and flow of data between components for embodiments of the invention.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention covers such modifications and variations that come within the scope of the invention.

Embodiments of the invention may provide a link between physical documents and a data set representing what is in an electronic mortgage loan file which provides a selectable connection to specific locations of fields on each electronic loan document where an element of the data set appears. Thus, embodiments of the invention provide a quick and simple verification function of loan document elements corresponding to relevant elements including, without limitation, loan amount, borrower income, borrower assets, and borrower credit bureau score, in a data set accompanying a mortgage loan file. It is to be understood however that embodiments presented herein relating to mortgage loan information are examples only and that the invention is not limited to mortgage loan data but may include any and all other types of data. Thus, embodiments of the invention provide systems and methods for linking relevant elements of any type of data set to respective locations of such elements in documents within electronic files corresponding to the data set.

In embodiments of the invention, a predetermined standardized selection of mortgage loan fields from a data set accompanying a mortgage loan file may be indexed. The particular fields selected for indexing may be very broad in order for necessary data to be universally available for all interested entities, such as originators and buyers of loans in the mortgage loan example. Thereafter, in embodiments of the invention, each field in the index may be mapped to documents in the mortgage loan package. Embodiments of the invention may employ, for example, a coordinate-based system that describes a specific location of each relevant field in each loan document in an electronic mortgage loan file. Such coordinates may be measured, for example, in points ($1/72^{nd}$ inch per point) or pixels (variable), or any other suitable units of distance and may be measured, for example, horizontally and/or vertically from one or more aspects, such as corners, margins, edges, or the like, of each loan document in the electronic mortgage loan file.

The mapping aspect for embodiments of the invention may involve, for example, associating each field in the index with one or more coordinates within the electronic loan file. In embodiments of the invention, such coordinates may consist, for example, of five values, such as a page number, a horizontal distance X points from a left margin and a vertical distance Y points from a top margin of the page to an upper left corner of the field, and a horizontal distance X points from the left margin and a vertical distance Y points from the top margin of the page to the lower right corner of the field. Employing such a coordinate tuple, embodiments of the invention may display a particular field, such as a mortgage loan field, as the field appears in all instances in documents in an electronic mortgage loan file.

The mapping aspect for embodiments of the invention may involve, for example, a data structure in which a location in every loan document in an electronic mortgage loan file for every occurrence of a recurring item of information, such as a loan amount, may be indexed against each such occurrence. Thus, each document in which the item of information occurs is identified in the index, and the location of the item of information in each identified document is specified and linked to those specific locations in the respective documents identified in the index. In the example embodiment of a mortgage loan package, embodiments of the invention provide enormous efficiencies in loan transfers by seamlessly combining the data structure with the ability to effortlessly move throughout the electronic file, for example, for verification of relevant information included in the mortgage loan documents.

Assume for example, that a field, such as a loan amount field, appears in a complex file, such as a mortgage loan package, at nine separate locations in the file. FIG. 1 is a table 100 that illustrates an example of coordinates in points from the top and left margins of each page to the upper left and lower right corners, respectively, for each occurrence of a particular field, such as a loan amount field in a mortgage loan package, for embodiments of the invention. Referring to the example table of FIG. 1, the coordinates, such as page number 102, vertical distance Y 104 and horizontal distance X 106 to the upper left corner of the field, and vertical distance Y 108 and horizontal distance X 110 to the lower right corner of the field, may represent each of the nine locations at which the loan amount field populated with a value 112 representing the loan amount appears in the electronic mortgage loan file. In embodiments of the invention, the coordinates may be incorporated into a more complex data structure containing other relevant information, such as an appraised value field. It is to be understood that such fields are examples only and that any other relevant information may be incorporated into the data structure for embodiments of the invention.

Embodiments of the invention may exploit such data to enable quickly scanning an entire electronic mortgage loan file for all instances of a given field. Referring again to the example shown in FIG. 1, a discrepancy may be identified automatically in one value, $336,000, for a particular field, such as the Aaaa CORP (LOAN ESTIMATE) field value 114, that is different from the values of $336,000 for all other occurrences of the same field in the electronic mortgage loan file. Thus, a review function for embodiments of the invention may be brought directly to an exact location within the documents of the electronic mortgage loan file to determine whether or not the data structure matches the source documents. FIG. 2 shows an example of a loan estimate document 200 having a loan amount field value 202 of $335,000 corresponding to field value 114 in FIG. 1 that is different from the values of $336,000 for all other occurrences of the same field. It is self-apparent that a complete underwriting process utilizing this framework for embodiments of the invention would add significant efficiencies to legacy processes.

In embodiments of the invention, one or more processors coupled to memory may index all relevant fields, such as all relevant mortgage loan fields, to coordinates within an electronic mortgage loan file, which may include numerous documents comprising, for example and without limitation, one or more property appraisals, borrower tax returns, borrower asset values, borrower credit bureau scores, borrower's income, and borrower's total debt submitted for approval of a mortgage loan. As noted, the one or more processors may map all relevant fields to coordinates comprising, for example, page number, vertical and horizontal distances to the upper left corner of the field, and vertical and horizontal distances to the lower right corner of the field.

FIG. 3 illustrates an example of a display of a list 300 of a small sample of mortgage loan documents that may be indexed by name and which may include links to fields in actual documents in an electronic mortgage loan file corresponding to those names for embodiments of the invention. FIG. 4 shows an example of a particular loan document, such as a Compliance Agreement document 400, which may be displayed by clicking on the corresponding name 302 on the index of names displayed in FIG. 3. A field, such as a mortgage loan field, may be a relevant item of data in an electronic loan file. As noted, mortgage loan fields may include, without limitation, one or more property appraisals, borrower tax returns, borrower asset values, borrower credit bureau scores, borrower's income, and borrower's total debt.

FIG. 5 illustrates an example of coordinates for an occurrence of a field, such as an income verification field 500, and the corresponding specific coordinate-based location of the corresponding field in a document illustrated in FIG. 6. Referring to FIG. 6, a document, such as an Income Calculation Worksheet 600, is shown with vertical 602 and horizontal 604 distances of 319 and 135 points, respectively, to the upper left corner 606 of the field, and vertical 610 and horizontal 612 distances, 328 and 207 points, respectively, to the lower right corner 608 of the field.

Legacy systems are complicated by an involvement of multiple different counterparties and file formats and are thus non-transparent and wasteful in terms of time and cost. Further, the inability of such legacy systems to collect and verify relevant loan data at the time of application is likewise wasteful in terms of time and cost. As noted, formats of at least some loan document may typically be different in mortgage loan files that originate from different sources. For example, while the document format variations may be less in loans underwritten according to FNMA requirements or in loans underwritten according to FHLMC requirements, the variation may be considerably greater in loans underwritten by private investors. Further, the format of certain documents, such as borrowers' pay stubs may be inherently variable in mortgage loan files that originate from the same source. Moreover, the loan file for a particular borrower who is employed by multiple employers may include pay stubs from each employer. In such case, according to the data structure aspect for embodiments of the invention, a location in each of multiple pay stubs in the mortgage loan file for every occurrence of the recurring item of information, such as a borrower's income, may be indexed against each such occurrence.

The data structure aspect for embodiments of the invention may involve, for example, identifying a specific location corresponding to each occurrence of relevant fields, such as the borrower's wages, in one or more documents, such as W-2 forms, in the electronic mortgage loan file, and linking each identified specific location corresponding to each actual occurrence of the relevant fields in the documents in the electronic file. Thereafter, in the event, for example, an investor wishes to purchase the loan with such data structure embedded, embodiments of the invention may involve scanning data populating all occurrences of the relevant fields in the plurality of documents in the electronic file, and generating a notification when data populating any of such occurrences differs from data populating any of the other occurrences of the relevant fields.

Assume, for example, an electronic mortgage loan file accompanied by a data set in which a particular debt to income ratio is recited as being based on an income of $110,000 for the borrower. Assume further that a scan of the data populating all occurrences of the borrower's income in the documents in the electronic mortgage loan file according to embodiments of the invention discloses that the data populating one occurrence of the borrower's income field in loan documents in the mortgage loan is $101,000 instead of the $110,000 figure populating all other occurrences of the borrower's income field in the loan documents in the electronic file. In that case, a notification or alert may be generated that an error or discrepancy may exist in the field in which the borrower's income is shown as $101,000.

Embodiments of the invention provide an execution platform that merges numerous borrower and lender functions to improve whole loan execution and standardizes file formats for simplified execution with numerous counterparts. Further, embodiments of the invention ensure accurate sourcing of loan data, such as W-2 forms and other tax forms, at the time of a loan application.

FIG. 7 is a schematic flow chart that illustrates an example of components and flow of data between components for embodiments of the invention. Referring to FIG. 7, such components may include, for example, one or more processors of a front end component 702 communicatively coupled to one or more processors of a formatting server 704, which may in turn be communicatively coupled to one or more processors of each of a plurality of a data review server 706. The data review components 707 may be accessible by one or more investor components 708, 710, and 712.

Figure 8:
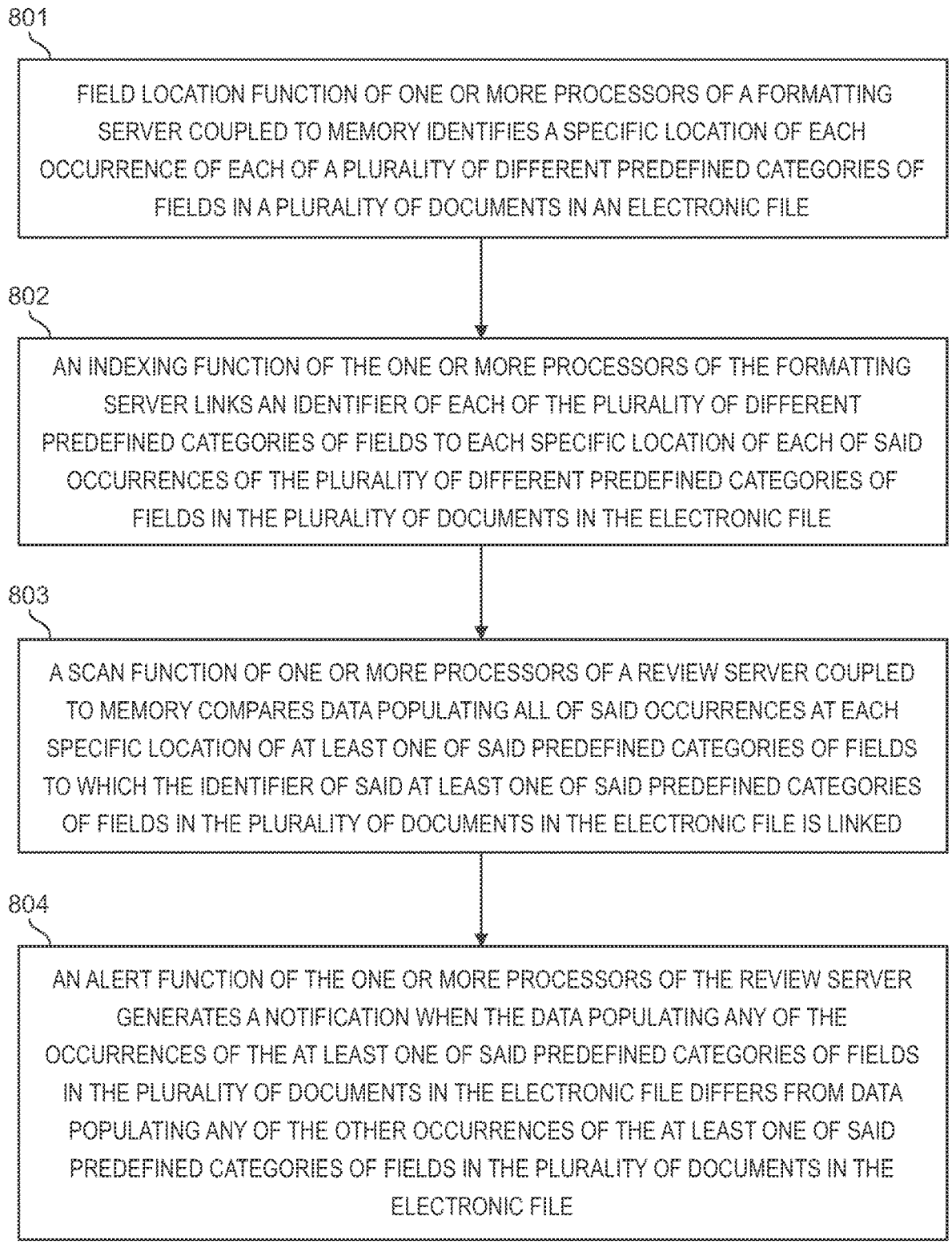
FIG. 8 is a flow chart that illustrates an example of a process according to embodiments of the invention.

FIG. 8 is a flow chart that illustrates an example of a process according to embodiments of the invention. Referring to FIG. 8, at 801, a field location function of one or more processors of a formatting server 704 coupled to memory identifies a specific location of each occurrence of each of a plurality of different predefined categories of fields in a plurality of documents in an electronic file received, for example, via a processor of a front end component 702. At 802, an indexing function of the one or more processors of the formatting server 704 links an identifier of each of the plurality of different predefined categories of fields to each specific location of each of said occurrences of the plurality of different predefined categories of fields in the plurality of documents in the electronic file.

Referring further to FIG. 8, thereafter, at 803, a scan function of one or more processors of a review server 706 coupled to memory compares data populating all of said occurrences at each specific location of at least one of said predefined categories of fields to which the identifier of said at least one of said predefined categories of fields in the plurality of documents in the electronic file is linked. At 804, an alert function of the one or more processors of the review server 706 generates a notification when the data populating any of the occurrences of the at least one of said predefined categories of fields in the plurality of documents in the electronic file differs from data populating any of the other occurrences of the at least one of said predefined categories of fields in the plurality of documents in the electronic file.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. The present invention may be a system, a method, and/or a computer program product at any possible technical detail level of integration. The computer program product may include a computer readable storage medium (or media) having computer readable program instructions thereon for causing a processor to carry out aspects of the present invention.

It is to be understood that embodiments of the invention may be implemented as processes of a computer program product, each process of which is operable on one or more processors either alone on a single physical platform or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is to be further understood that client devices that may be employed by embodiments of the invention may also comprise a number of external or internal devices, such as a mouse, a CD-ROM, DVD, keyboard, display, or other input or output devices. In general, such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device to implement the functions/acts specified in the flowchart and/or block diagram block or blocks.

The flowchart and block diagram in the Figures may illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system, comprising:
one or more processors of a review system server coupled to memory and programmed to:
identify a coordinate-based specific location of each occurrence of at least one predefined category of fields, each occurrence being identified in different locations on each of at least two or more documents in an electronic file, the at least two documents being different types of documents with at least one different predefined category of fields;
create a coordinate-based data structure that maps a specific, coordinate-based location of the occurrences of the predefined categories of fields on the at least two or more documents in the electronic file;
generate a table that displays the coordinate-based specific location of the occurrences of the predefined categories of fields and data populating each of the occurrences at a mapped coordinate-based specific location;
determine that the data populating an occurrence at an identified coordinate-based specific location of a first document differs from data populating an occurrence at a different identified coordinate-based specific location of a second document; and
generate a notification based on the determination.

2. The system of claim 1, the one or more processors being further programmed to create the coordinate-based data structure that maps the specific, coordinate-based location of each of the predefined categories of fields of the at least two or more documents in the electronic file, the mapped specific, coordinate-based location comprising an identity of a document on which a particular occurrence of a predefined categories of fields occurs and a coordinate-based location on the document.

3. The system of claim 1, the one or more processors being further programmed to:
compare the data populating each of said occurrences at each mapped coordinate-based specific location of at least one of said predefined categories of fields in a linked plurality of documents in the electronic file; and
determine that the data populating the occurrence at the identified coordinate-based specific location of the first document differs from data populating the occurrence at the different identified coordinate-based specific location of the second document.

4. The system of claim 1, the one or more processors being further programmed to identify the coordinate-based specific location of each said occurrence in each of the two or more documents in the electronic file.

5. The system of claim 1, the one or more processors being further programmed to identify coordinate-based horizontal and vertical coordinates for the specific location of each occurrence in each of the two or more documents in the electronic file.

6. The system of claim 1, the one or more processors being further programmed to identify coordinate-based horizontal and vertical coordinates and a page number for the specific location of each occurrence in each of the two or more documents in the electronic file.

7. The system of claim 1, the one or more processors being further programmed to identify the specific location of each occurrence in the two or more documents in the electronic file selected from a data set corresponding to information contained in a plurality of documents in the electronic file.

8. The system of claim 1, the one or more processors being further programmed to identify the specific location of each occurrence comprising at least one of a mortgage loan amount field, a mortgage loan property appraisal value field, a borrower income amount field, a borrower credit score field, or a borrower signature field in a plurality of documents in the electronic file.

9. The system of claim 1, the one or more processors being further programmed to link the identifier of each of a plurality of different predefined categories of fields to each specific location comprising a coordinate-based specific location of each of the occurrences in the two or more documents in the electronic file.

10. The system of claim 1, the one or more processors being further programmed to link the identifier of each of a plurality of different predefined categories of fields to each specific location comprising coordinate-based horizontal and vertical coordinates of the specific location of each of two diagonally opposed corners of each of the occurrences in the two or more documents in the electronic file.

11. The system of claim 10, the one or more processors being further programmed to compare recurring mortgage loan data populating all of the occurrences at each specific location of at least one of the predefined categories of fields to which the identifier of the at least one of the predefined categories of fields in the plurality of documents in the electronic file is linked.

12. The system of claim 1, the one or more processors being further programmed to link the identifier of each of a plurality of different predefined categories of fields to each specific location comprising coordinate-based horizontal and vertical coordinates and a page number for the specific location of each of said occurrences in the two or more documents in the electronic file.

13. The system of claim 1, the one or more processors being further programmed to compare recurring data populating the occurrences at each specific location of at least one of said predefined categories of fields to which the identifier of said at least one of said predefined categories of fields in a plurality of documents in the electronic file is linked.

14. A method, comprising:
identifying a coordinate-based specific location of each of a plurality of occurrences of each of a plurality of different predefined categories of fields, the plurality of occurrences being identified in at least two or more documents in an electronic file, a first document and a second document being different types of documents with at least one different predefined category of field;
create a coordinate-based data structure that maps a specific, coordinate-based location of each of the plurality of different predefined categories of fields of the at least two or more documents in the electronic file;
generating a table that displays the coordinate-based specific location of each of the plurality of different predefined categories of fields of the at least two or more documents in the electronic file and data populating each of the occurrences at a mapped coordinate-based specific location; and
generating a notification based on a determination that the data populating an occurrence at an identified coordinate-based specific location of a first document differs from data populating an occurrence at a different identified coordinate-based specific location of a second document.

15. The method of claim 14, further comprising creating a coordinate-based data structure that maps the specific, coordinate-based location of each of the plurality of different predefined categories of fields of the at least two or more documents in the electronic file, the mapped specific, coordinate-based location comprising an identity of a document on which a particular occurrence of a predefined categories of fields occurs and a coordinate-based location on the document.

16. The method of claim 14, further comprising:
comparing the data populating each of said occurrences at each mapped coordinate-based specific location of at least one of said predefined categories of fields in a linked plurality of documents in the electronic file; and
determining that the data populating the occurrence at the identified coordinate-based specific location of the first document differs from data populating the occurrence at the different identified coordinate-based specific location of the second document.

17. The method of claim 14, further comprising identifying the coordinate-based specific location of each said occurrence of each of the plurality of different predefined categories of fields in each of the plurality of documents in the electronic file.

18. The method of claim 14, further comprising identifying coordinate-based horizontal and vertical coordinates for the specific location of each occurrence of each of the plurality of different predefined categories of fields in each of the plurality of documents in the electronic file.

19. The method of claim 14, further comprising identifying coordinate-based horizontal and vertical coordinates and a page number for the specific location of each occurrence of each of the plurality of different predefined categories of fields in each of the plurality of documents in the electronic file.

20. A computer program product, comprising:
a non-transitory computer-readable medium having computer-readable program instructions embodied thereon, the computer-readable program instructions comprising instructions to:
identify a coordinate-based specific location of each of a plurality of occurrences of each of a plurality of different predefined categories of fields, the plurality of occurrences being identified in at least two or more documents in an electronic file, the at least two documents being different types of documents with at least one different predefined category of field;
generate a table that displays the coordinate-based specific locations of each of the plurality of different predefined categories of fields of the at least two or more documents in the electronic file and data populating each of the occurrences at a mapped coordinate-based specific location; and
determine that the data populating an occurrence at an identified coordinate-based specific location of a first document differs from data populating an occurrence at a different identified coordinate-based specific location of a second document;
generate a notification based on the determination.

* * * * *